United States Patent
Fukada

[11] Patent Number: 6,139,120
[45] Date of Patent: Oct. 31, 2000

[54] ROLL CONTROL DEVICE OF VEHICLES WITH BRAKING ESTIMATED AND TRIMMED BY SEPARATE PARAMETERS

[75] Inventor: Yoshiki Fukada, Susono, Japan

[73] Assignee: Toyota Jidosha Kabushiki Kaisha, Toyota, Japan

[21] Appl. No.: 09/323,928

[22] Filed: Jun. 2, 1999

[51] Int. Cl.[7] ............................... B60T 8/24; B60T 8/32; B60G 17/00

[52] U.S. Cl. .......................... 303/146; 180/197; 701/70; 701/37; 701/72; 280/5.508; 280/5.51; 280/5.506

[58] Field of Search .................. 280/5.51, 5.506, 280/5.507, 5.508; 701/72, 37, 38, 41, 48, 71, 82, 70, 83; 303/143, 146, 2, 148, 147, 192; 318/586, 587; 180/197

[56] References Cited

U.S. PATENT DOCUMENTS

| | | |
|---|---|---|
| 4,803,627 | 2/1989 | Yasuika et al. . |
| 4,807,128 | 2/1989 | Ikemoto et al. . |
| 4,809,176 | 2/1989 | Ouwa et al. . |
| 5,016,910 | 5/1991 | Nagai . |
| 5,134,352 | 7/1992 | Matsumoto et al. . |
| 5,640,324 | 6/1997 | Inagaki ..................................... 180/197 |
| 5,732,371 | 3/1998 | Fujita ........................................ 701/38 |
| 5,772,289 | 6/1998 | Nakazawa et al. ...................... 303/146 |
| 5,822,709 | 10/1998 | Fujita ......................................... 701/70 |
| 5,869,943 | 2/1999 | Nakashima et al. ....................... 701/70 |
| 5,941,334 | 8/1999 | Inagaki ................................... 280/5.51 |

FOREIGN PATENT DOCUMENTS

| | | |
|---|---|---|
| 196 32 943 A1 | 2/1998 | Germany . |
| 63-116918 | 5/1988 | Japan . |
| 3-90436 | 4/1991 | Japan . |
| 6-297985 | 10/1994 | Japan . |
| 10-81215 | 3/1998 | Japan . |

*Primary Examiner*—Douglas C. Butler
*Attorney, Agent, or Firm*—Oliff & Berridge, PLC

[57] ABSTRACT

A roll control device for a four-wheeled vehicle obtains a first parameter including a component indicative of a dynamic aspect of a rolling of a vehicle body such as a time derivative of the roll angle and a second parameter indicative of the degree of progress of the rolling such as a lateral acceleration of the vehicle body during its increasing phase, and applies a roll suppress braking to at least a front wheel serving at the outside of a turn to driftout the vehicle, so as to increase the radius of the turning curve, wherein the strength of the braking is determined according to the first parameter, while the start of execution of the braking is determined according to the second parameter exceeding a threshold value determined therefor.

16 Claims, 4 Drawing Sheets

ROLL CONTROL DEVICE OF VEHICLES WITH BRAKING ESTIMATED AND TRIMMED BY SEPARATE PARAMETERS

BACKGROUND OF THE INVENTION

1. Field of the Invention

The present invention related to a roll control device of a vehicle such as an automobile, and more particularly, to a device which controls a rolling of a vehicle body based upon a selective braking of a wheel or wheels.

2. Description of the Prior Art

It is a still standing desire that a vehicle such as an automobile is protected by the art of vehicle stability control from the rolling down due to a too sharp steering, particularly with those vehicles called recreation vehicles which are often driven like a slalom in the off-road open places.

As a matter of physical principle, the rolling of a vehicle during a turn running can be suppressed by decelerating the vehicle or increasing the radius of the turning curve, i.e. drifting out the vehicle, or doing both of these, so that the lateral centrifugal force proportional to the ratio of the square of the running speed to the radius of the running curve is decreased. In the four-wheeled vehicles handled as an object of the art of vehicle stability control, equipped with a brake system applicable a controlled braking to each of the four wheels independently of the other, it is known that the driftout of the vehicle is available by applying a braking to the front wheel serving at the outside of the turn, based upon the principle that the tire grip force available in the lateral direction is decreased in a reversal complement to the increase of the longitudinal tire grip force effected by the braking, since the vector addition of the longitudinal and lateral tire grip forces is restricted within the so-called friction circle.

Further, in the four-wheeled vehicle which has a vehicle body supported on pairs of front and rear wheels via an elastic suspension system, the rolling of the vehicle has a dynamic aspect that it is a rolling movement around a longitudinal roll axis as well as a static aspect that the lateral centrifugal force acting to the vehicle body at its center of gravity is statically balanced by the elastic force applied to the vehicle body from the elastic suspension proportional to the product of the rolling angle and the modulus of elasticity of the suspension system.

In Japanese Patent Laid-open Publication 63-116918, there is described a roll control device for a vehicle, wherein a parameter called "vehicle condition" is calculated based upon a signal received from a roll estimation sensor, and the vehicle speed is controlled to be decreased before the vehicle condition reaches a limit value.

In Japanese Patent Laid-open Publication 6-297985, there is described a roll control device for a vehicle, wherein a parameter called "roll down reference value" is calculated based upon the height of the center of gravity of the vehicle and a roll angle of vehicle body, and the vehicle is decelerated when the roll down reference value exceeds a limit value.

In Japanese Patent Laid-open Publication 10-81215 and German Patent Laid-open Publication DE 19632943 A1 corresponding thereto, there is described a method of driving a vehicle, wherein when the value of at least one rolling tendency indication parameter such as the lateral acceleration, a time derivative of the lateral acceleration, etc. exceeds a threshold value, the wheels serving at the outside of the turn are braked, so as to let the wheels slide outside of the turn according to the principle of reversal complement of the longitudinal tire grip force and lateral tire grip. (According to the German version distinctive of singularity and plurality, the braking is applied to a plurality of wheels serving at the outside of the turn.)

It is noted in all of the above three publications that, although the roll control is described to trigger the braking by each watching parameter exceeding its threshold value, it is not described how the braking is progressed. However, based upon the conventional standard concept of such a parameter-based automatic control, it is guessed that the parameter selected for watching to start the roll suppress control is watched in continuity to control the progress of the braking. Since the roll suppress controls of the abovementioned publications do not appear to stop the vehicle when the watched parameter has once exceeded the threshold value, the braking applied independently of the driver's intention will have to be released as soon as possible according to the subsidence of the rolling. Therefore, the braking will be applied under the control of the parameter which triggered the braking.

However, as described above, in the rolling of a four-wheeled vehicle, there are both dynamic and static aspects. In more detail, when the rolling state is judged, for example, by the lateral acceleration of the vehicle body, the urgency for a roll suppress control is different for two such turning states showing a common lateral acceleration that in one the vehicle body is under a static balance between the lateral centrifugal force and the elastic suspension force and in the other the vehicle body is still rolling toward outside of the turn. Therefore, in order to increase the theoretical precision of the roll control, the dynamic aspect of the rolling will have to be weighted. However, as a matter of actual practice, the precision of detection of dynamic parameters is generally inferior to that of static parameters, particularly when the detection incorporates the detection of the parameter trespassing a threshold value. Therefore, although the dynamic aspect is interested in the roll suppress control, it is hesitated to employ a dynamic parameter such as a time derivative of the roll angle as the parameter to trigger and control the roll suppress braking.

SUMMARY OF THE INVENTION

Under the above situations of the roll suppress control of the four-wheeled vehicles, it is a primary object of the present invention to provide an improved roll control device for the four-wheeled vehicles with an effective incorporation of a dynamic parameter while avoiding its handling difficulty.

In order to accomplish the above-mentioned primary object, the present invention proposes a device for controlling a rolling of a vehicle having a vehicle body, a pair of front wheels and a pair of rear wheels, an elastic suspension system interposed between the vehicle body and the pairs of front and rear wheels, a steering system, and a brake system for applying a braking to at least each of the pair of front wheels independently of the other, comprising:

first means for obtaining a first parameter indicative of a first rolling aspect of the vehicle body;

second means for obtaining a second parameter indicative of a second rolling aspect of the vehicle body; and third means for calculating a braking force to be applied to at least one of the pair of front wheels serving at an outside of a turn according to the first parameter, and controlling the brake system so as to apply the calculated braking force to at least said one front wheel when the second parameter exceeds a threshold value determined therefor.

By such an arrangement that the braking force to be applied to at least the front wheel serving at the outside of the turn for the roll suppress control is determined according to the first parameter, while it is actually applied thereto when the second parameter exceeds the threshold value determined therefor, the strength of the braking force to be applied for the roll suppress control can be calculated according to a dynamic parameter to be more adaptive to the dynamic aspect of the rolling movement, without the problem that the moment of such a dynamic parameter trespassing a threshold value is difficult to be accurately detected. In the roll suppress control by the braking which is generally executed against the driver's intention to hinder the primary function of the vehicle that it is to run, it is desired that the actuation of the control is delayed up to a possible limit, while ensuring the vehicle against a rolling down. Therefore, it provides a particular advantage in the operation of the roll suppress control that the timing of the operation is controlled based upon a parameter which can stably be watched, while the strength of the operation is controlled based upon a parameter more indicative of the actual state of the object of control.

In this connection, it is to be noted that, in the art of roll suppress control of the four-wheeled vehicles, it is generally implicitly understood, though not limited, that the art is principally intended for those vehicles such as the recreation vehicles or the like which generally have a relatively high center of gravity and, nevertheless, are often driven on off-road places at high freedom and/or wildness which will not be met on the streets or highways. In other words, when the automobiles, including those recreation vehicles, are driven along the streets or highways, there will be no need for such a roll control as to suppress the vehicle from rolling down, because the rolling down of the vehicle in the street or highway, when occurs, will be only at the final stage of a severe accident where the roll suppress control is no longer useful. Therefore, the drifting out the vehicle outside of a tuning to increase the radius of the turning curve is one of the actually effective measures in such an off-road open place driving. In other word, the above-mentioned threshold value for the second parameter may be set at a level high enough not to be exceeded by the second parameter when the vehicle equipped with the roll suppress control according to the present invention is driven through the streets or highways. Therefore, there is no fear that the vehicle guarded by the present invention abruptly drifts out across a center line on a street or a highway by an automatic actuation of the control.

As mentioned above, the roll control device according to the present invention will be desirably constructed when the above-mentioned first and second means are adapted to obtain the first and second parameters, respectively, the first parameter being more indicative of a dynamic performance of a rolling of the vehicle body than the second parameter.

As a preferred embodiment, the first means may obtain the first parameter so as to include a component indicative of the magnitude of a time derivative of a roll angle of the vehicle body, which is a fundamental dynamic factor of the rolling motion of the vehicle body, suggestive of how far the rolling will dynamically proceed under an imbalance between the lateral force such as the centrifugal force acting at the vehicle body during a turn running and the spring force of the suspension system.

In such a construction, the first means may obtain the first parameter such that the component is indicative of a ratio of the magnitude of the time derivative of the roll angle of the vehicle body to a maximum value determined therefor.

Further, as an embodiment, the first means may obtain the first parameter so as to include a first component indicative of the magnitude of a roll angle of the vehicle body and a second component indicative of the magnitude of a time derivative of the roll angle of the vehicle body. By such an arrangement, the first parameter indicates the static condition of the rolling movement of the vehicle body in addition to the dynamic condition thereof provided by the time derivative of the roll angle.

In such an arrangement, the first means may obtain the first parameter such that the fast component is indicative of a ratio of the magnitude of the roll angle of the vehicle body to the maximum value determined therefor and the second component is indicative of a ratio of the magnitude of the time derivative of the roll angle of the vehicle body to the maximum value determined therefor.

On the other hand, as a preferred embodiment, the second means may obtain the second parameter to be indicative of a lateral acceleration of the vehicle body at a center of gravity thereof at least when the magnitude thereof increases. In the dynamic system that the vehicle body is elastically supported on the wheels via the suspension, the lateral acceleration of the vehicle body at the center of gravity thereof indicates how far the rolling has actually proceeded. Therefore, it will be a prudent measure to employ the lateral acceleration as a parameter for triggering the braking of the roll suppress control as long as it is increasing.

However, the lateral acceleration of the vehicle body at the center of gravity rapidly subsides when the lateral force applied to the vehicle body approaches a balance with the spring force of the suspension system of the vehicle. Therefore, once after such a lateral acceleration has reached a peak, thereby showing that said balance has attained, it is considered to be desirable that an early releasing of the roll control braking as to directly follow the subsidence is avoided not to cause an oscillation of the vehicle body. Indeed, it is in an uprise phase of the lateral acceleration in which the rolling of the vehicle body is increasing that the timing of decision to execute the roll suppress control is essential, while in a phase of the roll subsiding the magnitude of the roll control braking is in any event decreasing according to the subsidence of the first parameter.

Therefore, as a preferred embodiment, the second means may obtain the second parameter such that it substantially corresponds to the magnitude of the lateral acceleration when said magnitude increases, and it decreases from an instant value thereof at a substantially constant rate when the magnitude of the lateral acceleration starts to decrease. It will be appreciated that the release of the roll suppress braking is substantially dependent on the first parameter, because in an ending phase of the roll suppress braking, even when the third means is still controlling the brake system to apply a braking force to the pertinent wheel or wheels, the third means will also be calculating the braking force to fade out according to the first parameter.

For the device of the present invention, the second means may obtain the second parameter based upon the lateral acceleration of the vehicle body at the center of gravity thereof obtained from an output signal of a lateral acceleration sensor. Alternatively, or further, the second means may obtain the second parameter based upon the lateral acceleration of the vehicle body at the center of gravity thereof obtained from an output signal of a vehicle speed sensor indicating a vehicle speed and an output signal of a yaw rate sensor indicating a yaw rate of the vehicle such that the lateral acceleration of the vehicle body at the center of gravity thereof is estimated as a product of the vehicle speed and the yaw rate.

Based upon those lateral accelerations, the third means may control the brake system so as to apply the calculated braking force to at least said one front wheel when both of the second parameter based upon the lateral acceleration sensor and the second parameter based upon the vehicle speed sensor and the yaw rate sensor exceed the threshold value. By such an arrangement, it is effectively avoided that the control of the roll suppress braking is affected by noises in obtaining the lateral acceleration of the vehicle body.

BRIEF DESCRIPTION OF THE DRAWINGS

In the accompanying drawings.

DESCRIPTION OF THE PREFERRED EMBODIMENT

The present invention will be described in more detail with respect to an embodiment thereof with reference to the accompanying drawings.

Figure 1A:
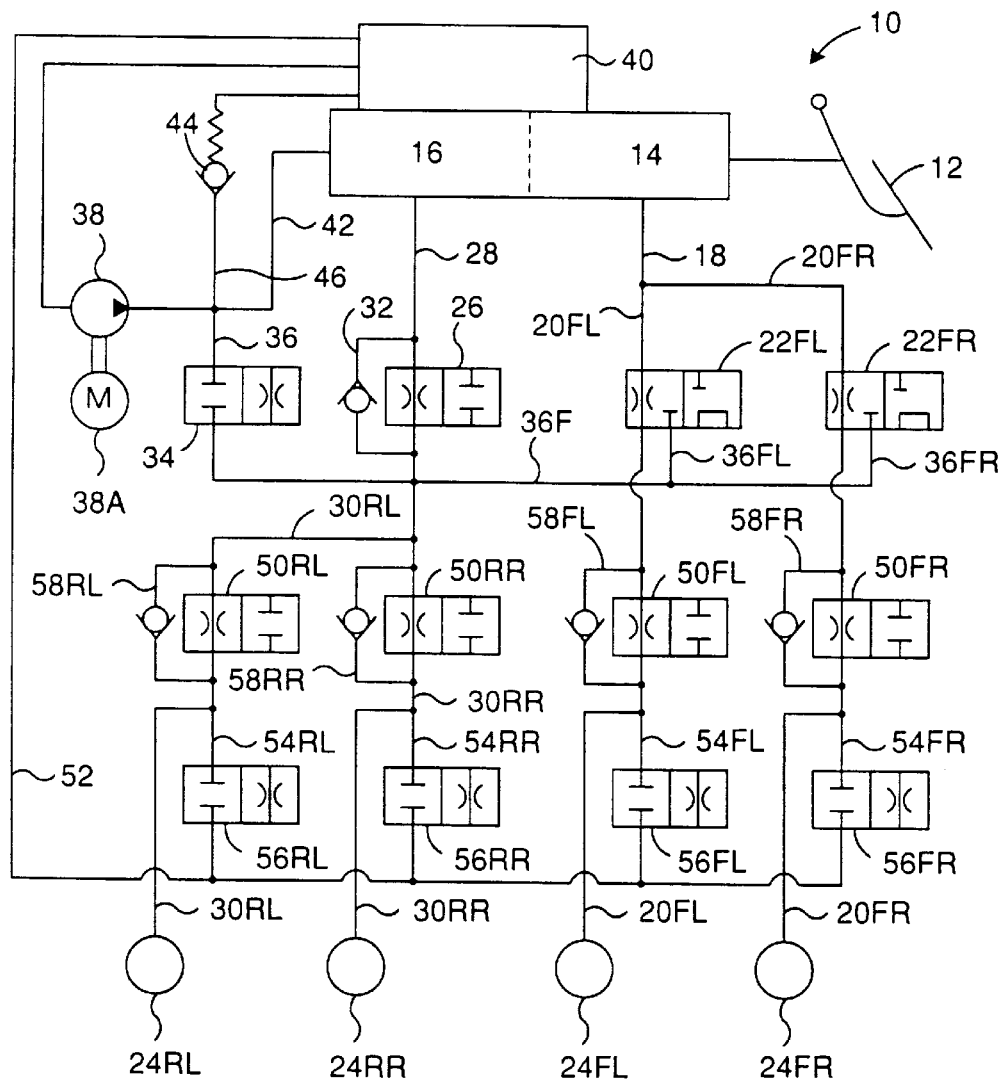
FIG. 1A is a diagrammatical illustration of an embodiment of a hydraulic circuit of a roll control device according to the present invention.

In FIG. 1A, a brake system generally designated by 10 includes a brake pedal 12 to be depressed by a driver, a master cylinder 14 and a hydro-booster 16 according to a conventional construction. A brake fluid pressurized by the master cylinder 14 according to a depression of the brake pedal 12 is conducted through a passage 18 and branch passages 20FL and 20FR to the wheel cylinders 24FL and 24FR of the front left and front right wheels, respectively. The passage 20FL incorporates changeover valves 22FL and 50FL in series. The changeover valve 22FL normally opens the passage 20FL through, and selectively interrupts the downstream side of the passage 20FL from its upstream side connected with the master cylinder 14, while connecting the downstream side of the passage 20FL with a passage 36FL branched from a passage 36F adapted to be supplied with an accumulator pressure. The changeover valve 50FL normally opens the passage 20FL through, and selectively interrupts the passage 20FL. The changeover valve 50FL is bypassed by a bypass passage 58FL including a one way valve oriented to allow the fluid to flow only from the downstream side to the upstream side thereof. Similarly, the passage 20FR incorporates changeover valves 22FR and 50FR in series. The changeover valve 22FR normally opens the passage 20FR through, and selectively interrupts the downstream side of the passage 20FR from its upstream side connected with the master cylinder 14, while connecting the downstream side of the passage 20FR with a passage 36FR branched from the passage 36F. The changeover valve 50FR normally opens the passage 20FR through, and selectively interrupts the passage 20FR. The changeover valve 50FR is bypassed by a bypass passage 58FR including a one way valve oriented to allow the fluid to flow only from the downstream side to the upstream side thereof.

The wheel cylinder 24FL is connected with a return passage 52 via an exhaust passage 54F incorporating a changeover valve 56FL which normally interrupts the exhaust passage 54FL, and selectively opens the exhaust passage 54FL through. Similarly, the wheel cylinder 24FR is connected with the return passage 52 via an exhaust passage 54FR incorporating a changeover valve 56FR which normally interrupts the exhaust passage 54FR, and selectively opens the exhaust passage 54FR through.

The pressurized brake fluid generated by the hydro-booster 16 is conducted through a passage 28 incorporating a changeover valve 26 to be branched to two passages 30RL and 30RR leading to the wheel cylinders 24RL and 24RR, respectively. The changeover valve 26 normally opens the passage 28 through, and selectively interrupts the passage 28. The changeover valve 26 is bypassed by a bypass passage 32 including a one way valve oriented to allow the fluid to flow only from the upstream side to the downstream side thereof. The passage 30RL incorporates a changeover valve 50RL which normally opens the passage 30RL through, and selectively interrupts the passage 30RL. The changeover valve 50RL is bypassed by a bypass passage 58RL including a one way valve oriented to allow the fluid to flow only from the downstream side to the upstream side thereof. Similarly, the passage 30RR incorporates a changeover valve 50RR which normally opens the passage 30RR through, and selectively interrupts the passage 30RR. The changeover valve 50RR is bypassed by a bypass passage 58RR including a one way valve oriented to allow the fluid to flow only from the downstream side to the upstream side thereof.

The wheel cylinder 24RL is connected with the return passage 52 via an exhaust passage 54RL incorporating a changeover valve 56RL which normally interrupts the exhaust passage 54RL, and selectively opens the exhaust passage 54RL through. Similarly, the wheel cylinder 24RR is connected with the return passage 52 via an exhaust passage 54RR incorporating a changeover valve 56RR which normally interrupts the exhaust passage 54RR, and selectively opens the exhaust passage 54RR through.

A pump 38 is provided to be driven by an electric motor 38A for selectively pumping the brake fluid from a reservoir 40 to a supply passage 36 connected with the passage 36F via a changeover valve 34 which normally interrupts the communication between the passages 36 and 36F and selectively communicates the passage 36 with the passage 36F. The output of the pump 38 is branched by a passage 42 to be supplied to the hydro-booster 16. The outlet passage 36 is also connected to the reservoir 40 by a relief passage 46 including a pressure relief valve 44. The hydro-booster 16 generates the flow of pressurized brake fluid supplied through the passage 28 from the pressurized brake fluid supplied through the passage 42 to be substantially of the same pressure level as the master cylinder pressure supplied through the passage 18.

Figure 1B:
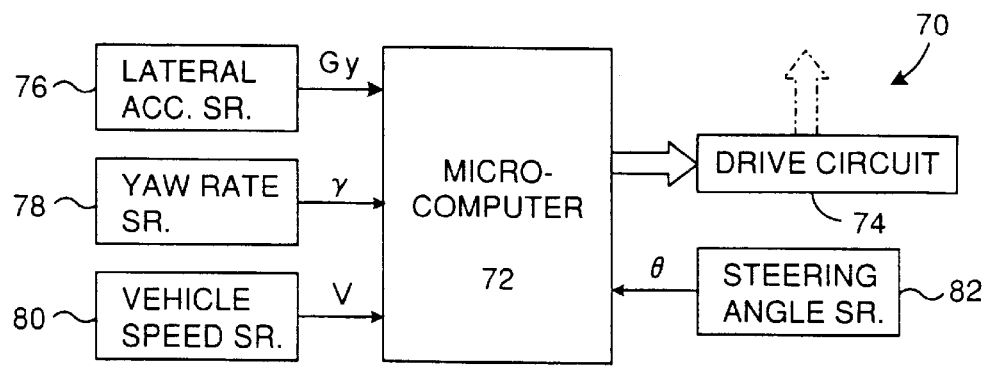
FIG. 1B is a diagrammatical illustration of an embodiment of an electric part of the roll control device according the present invention.

The changeover valves 22FL, etc. are all changed over between the two changeover positions by the respective electromagnetic actuators not shown in the figure under a control of the control system 70 shown in FIG. 1B. The control system of FIG. 1B comprises a microcomputer 72 constructed to execute various behavior control calculations for desired behavior control operations of the hydraulic circuit shown in FIG. 1A, including of course the roll suppress control calculations according to the present invention. The microcomputer 72 may be of a standard type including a central processing unit, a random access memory, a read only memory, input and output port means and a common bus interconnecting those components, and is supplied with input information about various parameters required for the original behavior control, and particularly information required for the roll suppress control according to the present invention, such as lateral acceleration Gy acting at the vehicle body from a lateral acceleration sensor 76, yaw rate γ of the vehicle body (not shown) from a yaw sensor 78, vehicle speed V from a vehicle speed sensor 80, and steeling angle θ from a steering angle sensor 82.

The microcomputer 72 carries out the roll suppress control calculations according to the present invention based upon the values of the read in parameters and the programs stored in the read only memory, and dispatches instruction signals to a drive circuit 74 which operates the changeover valves 22FL, etc. by energizing or deenergizing the electromagnetic actuators of the respective changeover valves, and the motor 38A of the pump 38.

Figure 2:
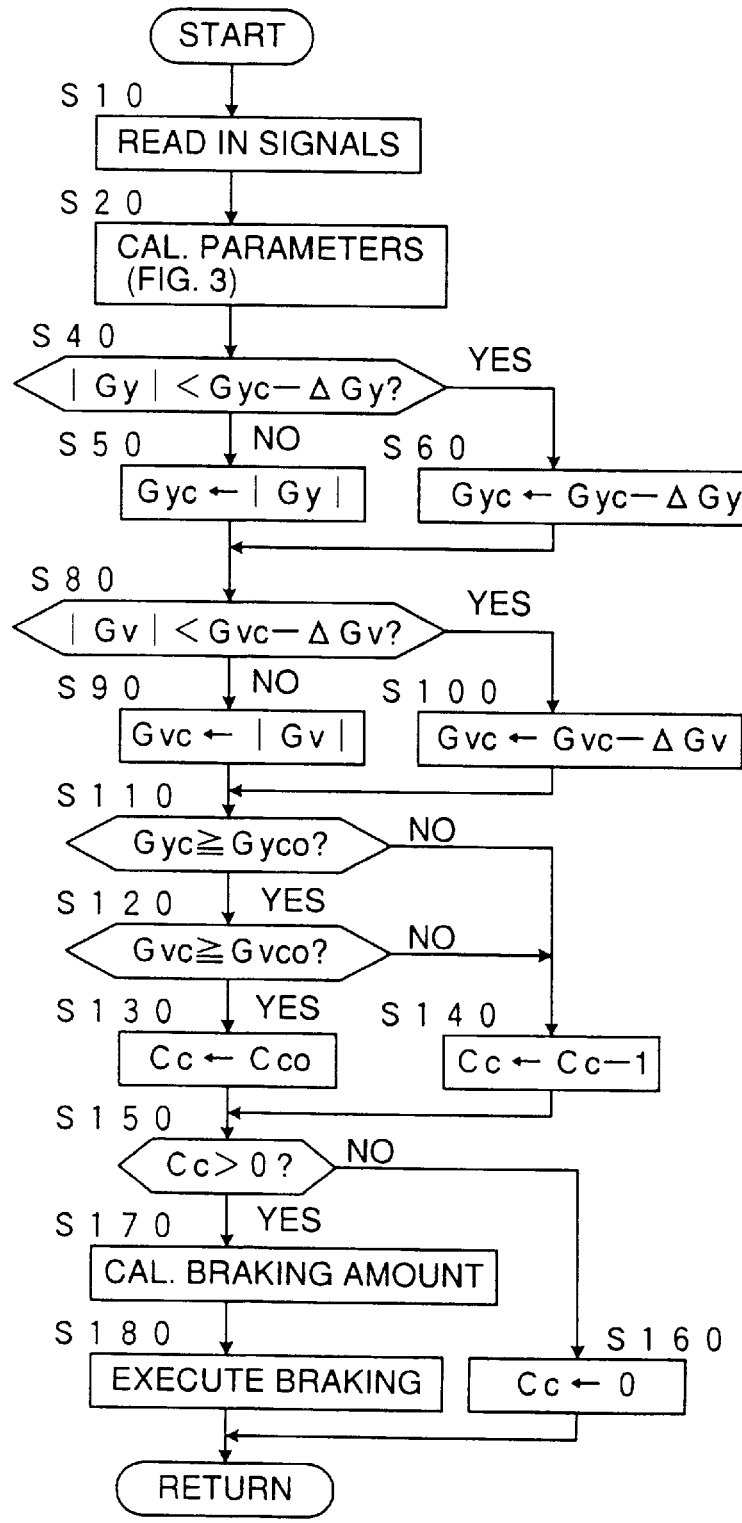
FIG. 2 is a flowchart showing a roll suppress control executed by the device according to the present invention.

In the brake system shown in FIGS. 1 and 2, assuming that a vehicle is turning leftward, when the changeover valve 34 is changed over from the position shown in the figure to the position opposite thereto for communicating the passage 36 to the passage 36F, while simultaneously changing over the changeover valve 22FR so that the downstream of the passage 20FR is disconnected from the passage 18 and connected to the passage 36FR, with a preceding startup of the pump 38 by the motor 38A, a controlled fluid pressure based upon the pump is supplied to the wheel cylinder 24FR of the front right wheel according to the duty ratio between the on and off states of the changeover valves 50FR and 56FR, thereby selectively braking the front light wheel. By such a braking, it is possible to control the vehicle to drift out toward the outside of the left turn so as to increase the radius of the left turn, so as to suppress a further increase of the rolling. The braking of the front right wheel will also have an effect of decreasing the vehicle speed, so as thereby to decrease the lateral centrifugal force acting at the vehicle body, thereby also contributing to suppressing the rolling of the vehicle body. It will be apparent that, in order to decelerate the vehicle for decreasing the lateral centrifugal force, a controlled braking may also be applied to the rear right wheel, or both of the rear right and left wheels. It is a well known art that the front wheel serving at the inside of the turn is generally not applied with such a controlled braking in order to obtain a reference wheel speed with which the speed of each braked wheel is compared for judging the strength of the braking.

An embodiment of the roll suppress control executed by the roll control device of the present invention shown in FIGS. 1A and 1B will be described hereinbelow with reference to FIGS. 2–5. The controls along the flowchart of FIG. 2 are started by a turning on of an ignition switch not shown in the figure of the vehicle and are cyclically repeated until the ignition switch is turned off, as is common in this kind of art.

When the control operation is started, in step 10 signals such as those shown in FIG. 1B are read in.

Figure 3:
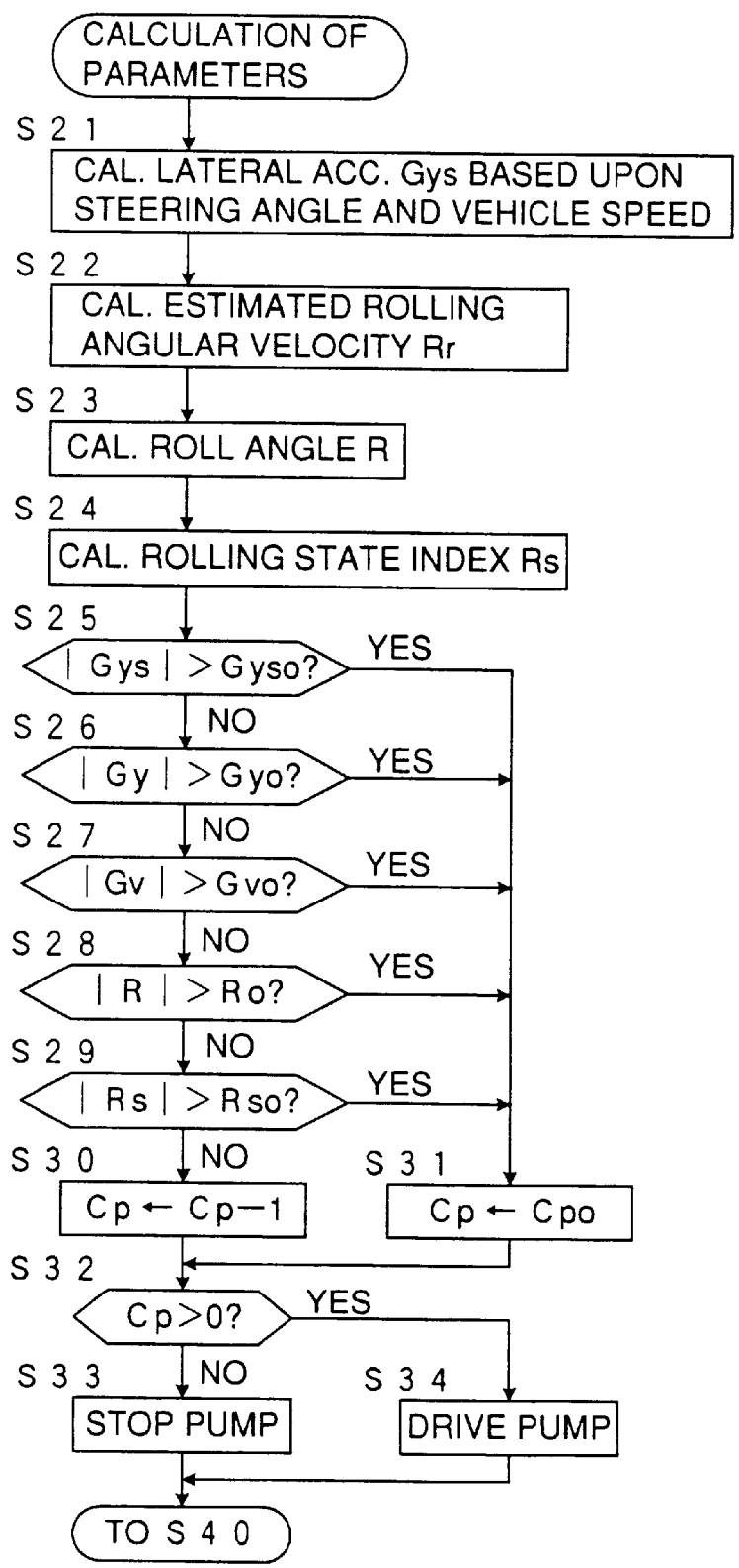
FIG. 3 is a flowchart showing a subroutine executed in step 20 of the flowchart of FIG. 2.

In step 20, calculations of parameters are executed according to a subroutine such as shown in FIG. 3. For the convenience of understanding the shown embodiment, the calculations of parameters according to the flowchart of FIG. 3 are described hereinbelow, prior to proceeding to step 40.

Referring to the flowchart of FIG. 3, in step 21, a lateral acceleration Gys based upon the steering angle of the vehicle speed is calculated as follows:

$$Gys = V^2 \cdot 0 / \{(1 + Kh \cdot V^2) Rg \cdot H\} \tag{1}$$

wherein V and 0 are the vehicle speed and the steering angle detected by the vehicle speed sensor 80 and the steering angle sensor 82 shown in FIG. 1B, Kh is an appropriate stability factor, Rg is the gear ratio of the steering system (not shown) and H is the so-called wheel base.

In step 22, an estimated rolling angular velocity Rr is calculated based upon the natural frequency ωo of the vehicle body of rolling around a longitudinal roll axis thereof (not shown in the figure), the lateral acceleration Gy detected by the lateral acceleration sensor 76, a static roll angle φo of the vehicle body to be caused by a lateral application of a unit gravitational acceleration thereto, a damping factor ξ and a cycle time ΔT of the control through the flowchart of FIG. 2 as follows:

$$Rr = Rr + \{\omega o^2 (Gy \cdot \phi o - R) - 2 \omega o \cdot \xi \cdot Rr\} \Delta T \tag{2}$$

wherein R is a roll angle calculated as follows:

$$R = R + Rr \cdot \Delta T \tag{3}$$

As is conventional in the art, in equations 2 and 3, Rr and R on the right side of the sign of equality are the values thereof calculated in the previous cycle of scanning through the flowchart. Further, as is usual in the art, the roll angle R and the rolling angular velocity Rr are expressed to be positive when the vehicle body is inclined or forced to incline leftside (or counter-clockwise) as viewed from the rear of the vehicle, and to be negative when the vehicle body is inclined or forced to incline rightside (or clockwise) as viewed from the rear of the vehicle.

In step 24, a parameter Rs herein called "rolling state index" is calculated as follows:

$$Rs = |Gy| / Gylim + |Rr| / Rrlim \tag{4}$$

wherein Gylim is an allowable limit of the lateral acceleration predetermined therefor, and Rrlim is an allowable limit of the rolling angular velocity predetermined therefor. As will be noted, the roll index corresponds to the first parameter described above, and includes a component |Gy|/Gylim substantially proportional to the roll angle of the vehicle body elastically supported on the wheels via an elastic suspension system, thereby indicative a static state of the rolling, and a component |Rr|/Rrlim indicative of a dynamic performance of the vehicle body in the rolling movement. Each of the values of Gylim and Rrlim may be a constant value or may be variably set according to the vehicle speed V, etc.

In step 25, it is judged if the absolute value of the lateral acceleration Gys calculated in step 21 based upon the steeling angle and the vehicle speed is larger than a threshold value Gyso predetermined therefor. If the answer is no, the control proceeds to step 26, whereas if the answer is yes, the control proceeds to step 31.

In step 26, it is judged if the absolute value of the lateral acceleration Gy detected by the lateral acceleration sensor 76 is larger than a threshold value Gyo predetermined therefor. If the answer is no, the control proceeds to step 27, whereas if the answer is yes, the control proceeds to step 31.

In step 27, denoting a product of the yaw rate γ detected by the yaw rate sensor 78 and the vehicle speed V detected by the vehicle speed sensor 80 as Gv, it is judged if the absolute value of Gv is larger than a threshold value Gvo predetermined therefor. If the answer is no, the control proceeds to step 28, whereas if the answer is yes, the control proceeds to step 31.

In step 28, it is judged if the absolute value of the roll angle R calculated in step 23 is larger than a threshold value Ro predetermined therefor. If the answer is no, the control proceeds to step 29, whereas if the answer is yes, the control proceeds to step 31.

In step 29, it is judged if the absolute value of the rolling state index Rs calculated in step 24 is larger than a threshold value Rso predetermined therefor. If the answer is no, the control proceeds to step 30, whereas if the answer is yes, the control proceeds to step 31.

In step 31, a count denoted Cp is set to its certain initial value Cpo, whereas in step 30 the count Cp is decreased by 1. Therefore, the count Cp is set to the initial value Cpo every time when at least one of such judgements as made in steps 25–29 is yes in each cycle, while the count Cp is decreased by 1 at each cycle if none of the judgements made in steps 25–29 was yes through the cycle.

In step 32, it is judged if the count Cp is larger than zero. If the answer is yes, the control proceeds to step 34, and the pump 38 of FIG. 1A is started or maintained in operation when it has already been started, whereas if the answer is no, the control proceeds to step 33, and the pump 38 is stopped or maintained at rest when it has already been stopped.

Therefore, it will be appreciated that the pump 38 is started and kept in operation when a necessity of executing the roll suppress control by the device according to the present invention is anticipated by at least one of the conditions of steps 25–29 being judged yes, while when the pump has once been started, the stopping thereof is delayed until a period corresponding to a product of the cycle time and the count Cpo lapses from a time point at which it was confirmed that none of the conditions of steps 25–29 was judged yes. As will be appreciated, such a conditioning for the operation of the pump 38 as described above economically but definitely supports a sound operation of the improved roll control device according to the present invention.

Further, if the pump is stopped immediately when none of the conditions of steps 25–29 was judged yes, the pump will not only be switched on and off too often, when the rolling of the vehicle body occurs at a relatively high frequency such as in a slalom, thereby consuming rather a more amount of electric power than being inertially continuously operated between two successive switchings, also causing not only a corresponding shortening of the life of a motor power switch, but also being too late to be in a fully effective operation tightly catching up the need of the hydraulic pressure for applying a controlled braking force to a certain wheel or wheels. In consideration of the above, the pump 38 is stopped only after such a period has lapses from the time point at which none of the conditions of steps 25–29 was judged yes that will be long enough to skip off an oscillatory subsidence of the rolling state.

Figure 5:
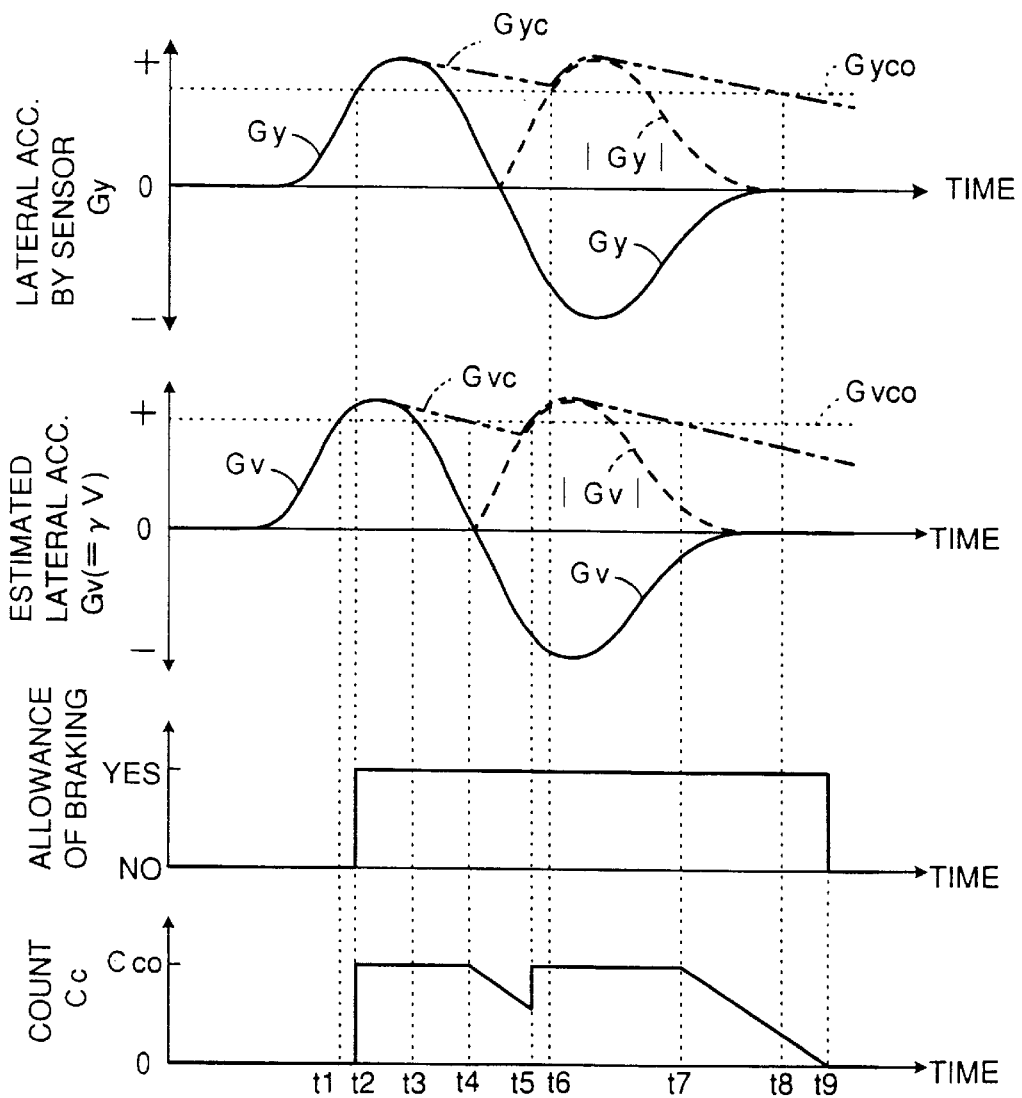
FIG. 5 is a set of synchronized graphs showing an example of changes of several parameters concerned according to the progress of the roll control operation by the device of the present invention.

Returning to the flowchart of FIG. 2, in step 40 it is judged if the absolute value of the lateral acceleration Gy detected by the lateral acceleration sensor 76 is smaller than a parameter herein called a fast "rolling level index" and denoted as Gyc by an amount more than a small unit difference ΔGy. It will be noted that the roll level index corresponds to the second parameter described above. If the answer is no, the control proceeds to step 50 and the first rolling level index Gyc is made equal to the absolute value of Gy, whereas if the answer is yes, the control proceeds to step 60, and the first rolling level index Gyc is decreased as much as ΔGy. Therefore, the first rolling level index Gyc is such a value that is equal to the absolute value of Gy as long as the absolute value of Gy does not substantially decrease such as not to decrease at a minute rate higher than ΔGy per one cycle time of the control through the flowchart of FIG. 2, while when the absolute value of Gy decreases at a rate larger than ΔGy per one unit cycle time, the first rolling level index Gyc does not follow such a decrease of the absolute value of Gy but decreases at it own decreasing rate such as ΔGy per one unit cycle time. The performance of Gyc is shown in FIG. 5 of which a detailed description will be made later.

In step 80, it is judged if the absolute value of Gv, i.e. γV, is smaller than Gvc herein defined as a second rolling level index by an amount more than a corresponding small unit value ΔGv. The second rolling level index which also corresponds to the above-mentioned second parameter is employed to exclude a useless operation of the device due to noises in measuring the lateral acceleration of the vehicle body. When the answer is no, the control proceeds to step 90, and the second rolling level index Gvc is made equal to the absolute value of Gv, whereas when the answer is yes, the control proceeds to step 100, and Gvc is decreased as much as ΔGv. Therefore, similarly, the second rolling level index Gvc is equal to the absolute value of Gv as long as the absolute value of Gv does not substantially decrease such as not to decrease at a rate higher than ΔGv per one unit cycle time, while when the absolute value Gv decreases at a rate higher than ΔGv per one unit cycle time, the second rolling level index Gvc does not follow the decrease of Gv but decreases at its own decreasing rate such as ΔGv per one unit cycle time. The performance of Gvc is also shown in FIG. 5 of which a detailed description will also be made later.

In step 110, it is judged if the first rolling level index Gyc is equal to or larger than a threshold value Gyco predetermined therefor. When the answer is yes, the control proceeds to step 120, and it is judged if the second rolling level index Gvc is equal to or larger than a threshold value Gvco predetermined therefor. When the answer is yes, the control proceeds to step 130, whereas when the answer of step 110 or step 120 is no, the control proceeds to step 140.

In step 130, a count denoted Cc is set to its initial value Cco, while in step 140 the count Cc is decreased by 1. The function of the count Cc will be described later with reference to FIG. 5.

Figure 4:
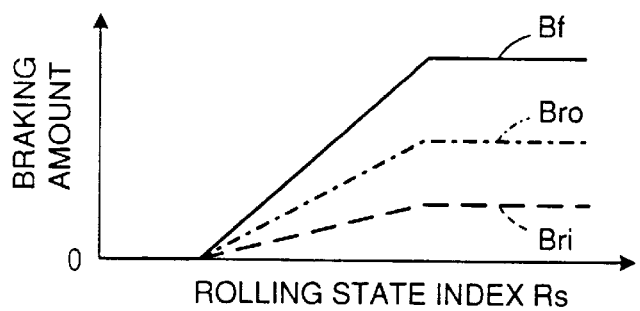
FIG. 4 is a graph showing examples of the magnitude of the braking amount to be determined according to the magnitude of a rolling state index serving as the above-mentioned first parameter.

In step 150, it is judged if the count Cc is larger than 0. When the answer is yes, the control proceeds to step 170, and a braking amount to be applied to a pertinent wheel or wheels is calculated based upon the rolling state index Rs calculated in step 24 according to a map such as shown in FIG. 4. In the embodiment shown in FIG. 4, a curve denoted Bf shows the braking amount to be applied to the front wheel serving at the outside of a turn principally for the purpose of drifting out the vehicle toward outside of the turn to increase the radius of the running curve, so as thereby to decrease the lateral centrifugal force acting at the vehicle body. The operation of the device according to the present invention may depend only upon such a drifting out of the vehicle, although such a braking will also have an effect of decelerating the vehicle.

The curve denoted Bro is prepared for simultaneously braking a rear wheel serving at the outside of the turn as a modification. When the rear wheel serving at the outside of the turn is braked, in addition to the effect of decelerating the vehicle, a further effect is available that a moment for turning the vehicle toward the drifting out is generated around said rear wheel. However, when the rear wheel is braked, it can cause or increase a side sliding of the rear portion of the vehicle according to the principle of complementary increase/decrease of the longitudinal and lateral tire grips within the friction circle, so as thereby to cancel the heading of the vehicle toward the outside of the turn. Therefore, the application of the braking to the rear wheel serving at the outside of the turn will need a consideration in this respect.

The curve denoted Bri is also prepared for simultaneously braking a rear wheel serving at the inside of the turn as a modification. The braking at said rear wheel will be effective for the purpose of the present invention only in decelerating the vehicle to decrease the lateral centrifugal force. However, since the braking at the rear wheel serving at the inside of the turn has an effect of canceling the heading of the vehicle toward the outside of the turn by a turn moment generated around said wheel, the application of the braking to said rear wheel will also need a consideration in this respect.

In step 180, the braking is executed according to a schedule such as shown in FIG. 4, so as to apply a controlled braking to a pertinent wheel or wheels. When the controlled braking is applied only to the wheel serving at the outside of the turn, the brake system for the pair of rear wheels may be left open for the driver's operation, so that sometime the automatic roll suppress control will be executed in parallel with a skilled driver's depression of the brake pedal.

When the answer of step 150 is no, the control proceeds to step 160, and the count Cc is reset to 0. The control through steps 10–step 180 or step 160 is repeated at the cycle time until the ignition switch is turned off.

The purposes and functions of steps 40–180 will be more clearly appreciated by reference to FIG. 5 showing an example that the lateral acceleration Gy detected by the sensor 76 and the lateral acceleration Gv estimated as a product of the yaw rate $\gamma$ detected by the yaw rate sensor 78 and the vehicle speed V detected by the vehicle speed sensor 80 change as shown in the first and second ranks of FIG. 5. Such a change of the lateral acceleration acting at the vehicle body will occur when a vehicle is alternately turned like playing a slalom. In the condition shown in FIG. 5, the parameter Gy based upon the lateral acceleration sensor and the parameter Gv based upon the vehicle speed sensor and the yaw rate sensor are both normally operating, so that the parallel provision of these two parameter systems is not exhibiting its essential value.

As described with respect to step 170, the braking amount Bf to be applied to a front wheel serving at the outside of a turn is determined based upon a parameter such as the rolling state index Rs calculated in step 24 of the flowchart of FIG. 3, so that Bf is raised when Rs increases beyond a certain value and gradually increase up to an amount at which it saturates as shown in FIG. 4. However, the rolling state index Rs including the time derivative of the roll angle is, although it is indicative of the dynamic performance of the vehicle body rolling, quickly changeable, and will render a difficulty when the timing of starting the roll suppress control must be determined by its value exceeding a certain threshold value. An oscillatory inertial movement of the vehicle body in the rolling will also directly affect the value of Rs.

Therefore, the determination to execute the braking or not is made based upon the parameter called above as the rolling level index. In the shown embodiment, the rolling level index is provided in duplicate as the first rolling level index Gyc and the second rolling level index Gvc, for the purpose of obviating the influence of noises in the detection of the lateral acceleration of the vehicle. As already described, the rolling level index Gyc or Gvc changes so as to increase along with the increase of the absolute value of the lateral acceleration Gy or Gv, respectively, but does not follow the decrease of the absolute value of Gy or Gv, while decreasing at its own relatively moderate rate which is substantially constant in the shown embodiment.

In the rolling of the vehicle body, the lateral acceleration Gy or Gv typically shows a performance like a convex of the "sin" curve as shown in FIG. 5, as long as it remains within a recoverable range, according to the balance between the lateral centrifugal force and the spring force of the wheel suspension. On the other hand, it is substantially only during the uprise phase of the rolling that the judgment to execute or not yet to execute the roll suppress braking is need, particularly in the roll suppress control according to the present invention, because when once the roll suppress braking has been triggered, the magnitude of the braking is controllable by the rolling state index. Therefore, it is considered to be rather desirable that the control for ending the roll suppress control is substantially left on the judgment based upon the rolling state index Rs, not to interfere with the variation of Rs or the oscillatory performance of the vehicle body on the spring suspension.

Further, if the vehicle is driven like a slalom which is one of the most interested manners of driving in which the improvement by the present invention is expected to be exhibited, it is contemplated that the judgement to execute or not to execute the roll suppress control may better be done only once at the beginning of a series of slalom movement, while leaving the actual application of left and right alternating brakings to the left and right alternating wheels on the variation of the rolling state index Rs.

As will be appreciated in the example shown in FIG. 5, the first rolling level index Gyc increases in coincidence with the absolute value of Gy to exceed its threshold value Gyco for the execution of the braking at time point t1, while the second rolling level index Gv exceeds its threshold value Gvco at time point t2, so that the execution of the braking is triggered or allowed at this time point. Thereafter, Gy and Gv reach their respective peaks and then start to decrease, and at time point t3, Gv lowers below the threshold Gvco. However, since the time counting by the count Cc is incorporated as shown by steps 130, 140 and 150, the execution of the braking is still maintained. In the meantime, Gvc is again caught by the increase of Gv in the opposite direction, and at time point t5 it again exceeds Gvco, so that the allowance of the braking is recovered to continue over the peak point of Gv in the opposite direction. In the meantime, at time point t6, Gyc is also caught by the increase of Gy in the opposite direction. At time point t7, Gvc lowers again below Gvco, while Gyc also lowers below Gyco at time point t8, and finally at time point t9, the execution of the braking is stopped. Thus, it will be appreciated that the braking during such a slalom is through controlled by the more dynamic parameter Rs when its timing of execution was once determined by the more stably reliable parameter, i.e. the lateral acceleration acting at the vehicle body, indeed a duplicate confirmation by Gy and Gv in the shown embodiment.

Although the present invention has been described in detail with respect to some preferred embodiments thereof, it will be apparent for those skilled in the art that various modifications are possible with respect to the shown embodiments within the scope of the present invention.

What is claimed is:

1. A device for controlling a rolling of a vehicle having a vehicle body, a pair of front wheels and a pair of rear wheels, an elastic suspension system interposed between the vehicle body and the pairs of front and rear wheels, a steeling system, and a brake system for applying a braking to at least each of the pair of front wheels independently of the other, comprising first means for obtaining a first parameter indicative of a first rolling aspect of the vehicle body;

second means for obtaining a second parameter indicative of a second rolling aspect of the vehicle body; and third means for calculating a braking force to be applied to at least one of the pair of front wheels serving at an outside of a turn according to the first parameter, and controlling the brake system so as to apply the calculated braking force to at least said one front wheel when the second parameter exceeds a threshold value determined therefor.

2. A device according to claim 1, wherein the first and second means are adapted to obtain the first and second parameters, respectively, such that the first parameter is more indicative of a dynamic performance of a rolling of the vehicle body than the second parameter.

3. A device according to claim 2, wherein the first means obtain the first parameter so as to include a component indicative of the magnitude of a time derivative of a roll angle of the vehicle body.

4. A device according to claim 3, wherein the first means obtain the first parameter such that the component is indicative of a ratio of the magnitude of the time derivative of the roll angle of the vehicle body to a maximum value determined therefor.

5. A device according to claim 2, wherein the first means obtain the first parameter so as to include a first component indicative of the magnitude of a roll angle of the vehicle body and a second component indicative of the magnitude of a time derivative of the roll angle of the vehicle body.

6. A device according to claim 5, wherein the first means obtain the first parameter such that the first component is indicative of a ratio of the magnitude of the roll angle of the vehicle body to a maximum value determined therefor and the second component is indicative of a ratio of the magnitude of the time derivative of the roll angle of the vehicle body to a maximum value determined therefor.

7. A device according to claim 2, wherein the second means obtain the second parameter to be indicative of a lateral acceleration of the vehicle body at a center of gravity thereof at least when the magnitude thereof increases.

8. A device according to claim 7, wherein the second means obtain the second parameter such that it substantially corresponds to the magnitude of the lateral acceleration when said magnitude increases, and it decreases from an instant value thereof at a substantially constant rate when the magnitude of the lateral acceleration starts to decrease.

9. A device according to claim 8, wherein the second means obtain a first one of the second parameter by employing the lateral acceleration of the vehicle body at the center of gravity thereof obtained from an output signal of a lateral acceleration sensor and a second one of the second parameter by employing the lateral acceleration of the vehicle body at the center of gravity thereof obtained from an output signal of a vehicle speed sensor indicating a vehicle speed and an output signal of a yaw rate sensor indicating a yaw rate of the vehicle such that the lateral acceleration of the vehicle body at the center of gravity thereof is estimated as a product of the vehicle speed and the yaw rate, and the third means control the brake system so as to apply the calculated braking force to said one front wheel when both of the first and second ones of the second parameter exceed the threshold value.

10. A device according to claim 7, wherein the second means obtain the second parameter based upon the lateral acceleration of the vehicle body at the center of gravity thereof obtained from an output signal of a lateral acceleration sensor.

11. A device according to claim 9, wherein the second means further obtain the second parameter based upon the lateral acceleration of the vehicle body at the center of gravity thereof obtained from an output signal of a vehicle speed sensor indicating a vehicle speed and an output signal of a yaw rate sensor indicating a yaw rate of the vehicle such that the lateral acceleration of the vehicle body at the center of gravity thereof is estimated as a product of the vehicle speed and the yaw rate, and the third means control the brake system so as to apply the calculated braking force to said one front wheel when both of the second parameter based upon the lateral acceleration sensor and the second parameter based upon the vehicle speed sensor and the yaw rate sensor exceed the threshold value.

12. A device according to claim 7, wherein the second means obtain the second parameter based upon the lateral acceleration of the vehicle body at the center of gravity thereof obtained from an output signal of a vehicle speed sensor indicating a vehicle speed and an output signal of a yaw rate sensor indicating a yaw rate of the vehicle such that the lateral acceleration of the vehicle body at the center of gravity thereof is estimated as a product of the vehicle speed and the yaw rate.

13. A device for controlling a rolling of a vehicle having a vehicle body, a pair of front wheels and a pair of rear wheels, an elastic suspension system interposed between the vehicle body and the pairs of front and rear wheels, a steering system, and a brake system for applying a braking force to at least each of the pair of front wheels separately of the other, comprising:

means for obtaining a parameter indicative of a rolling state of the vehicle body; and means for calculating a braking force to be applied to at least one of the pairs of front and rear wheels so that a larger braking force in total is applied to one or more of the pairs of front and rear wheels serving at an outside of a turn than to one or more of the pairs of front and rear wheels serving at an inside of the turn according to the parameter, and controlling the brake system so as to apply the calculated braking force to the pertinent one or more of the pairs of front and rear wheels.

14. A device according to claim 13, wherein the braking force calculation means calculate the braking force so as to apply a braking force only to one of the pair of front wheels serving at the outside of the turn.

15. A device according to claim 13, wherein the braking force calculation means calculate the braking force so as to apply a first braking force to one of the pair of front wheels serving at the outside of a turn, and a second braking force to one of the pair of rear wheels serving at the outside of the turn.

16. A device according to claim 13, wherein the braking force calculation means calculate the braking force so as to apply a first braking force to one of the pair of front wheels serving at the outside of a turn, a second braking force to one of the pair of rear wheels serving at the outside of the turn, and a third braking force to one of the pair of rear wheels serving at the inside of the turn.

* * * * *